United States Patent
Waters et al.

(10) Patent No.: US 8,289,205 B2
(45) Date of Patent: Oct. 16, 2012

(54) REACQUIRING SATELLITE SIGNALS QUICKLY

(75) Inventors: Deric W. Waters, Dallas, TX (US); June Chul Roh, Plano, TX (US); Sandeep Rao, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/227,108

(22) Filed: Sep. 7, 2011

(65) Prior Publication Data
US 2011/0316740 A1 Dec. 29, 2011

Related U.S. Application Data

(62) Division of application No. 12/565,927, filed on Sep. 24, 2009, now Pat. No. 8,212,720.

(51) Int. Cl.
*G01S 19/24* (2010.01)
(52) U.S. Cl. .................................................. 342/357.63
(58) Field of Classification Search ............... 342/357.2, 342/357.25, 357.63, 357.71, 357.76; 701/213, 701/215, 468
See application file for complete search history.

(56) References Cited

U.S. PATENT DOCUMENTS

| | | | | |
|---|---|---|---|---|
| 5,774,829 A | * | 6/1998 | Cisneros et al. | 701/475 |
| 5,808,581 A | * | 9/1998 | Braisted et al. | 342/357.58 |
| 7,375,682 B1 | * | 5/2008 | Tester et al. | 342/357.63 |
| 2002/0015439 A1 | * | 2/2002 | Kohli et al. | 375/148 |
| 2005/0055160 A1 | * | 3/2005 | King | 701/213 |

* cited by examiner

*Primary Examiner* — Dao Phan
(74) *Attorney, Agent, or Firm* — Steven A. Shaw; W. James Brady; Frederick J. Telecky, Jr.

(57) ABSTRACT

Embodiments of the invention provide a method of reacquiring satellite signals quickly. A pseudorange of at least one satellite is estimated. A user's position is also estimated. Then a signal from at one or more satellites may be received. By detecting when the user is stationary, the Doppler frequency estimation can be corrected or the SNR can be boosted more both of which lead to improved performance. The embodiments allow a GNSS receiver to process signals in when the signal level would otherwise be too low—for example indoors. The embodiments can improve performance when one or more satellites are temporarily blocked but one or more satellites are still being tracked.

4 Claims, 7 Drawing Sheets

REACQUIRING SATELLITE SIGNALS QUICKLY

CROSS-REFERENCE TO RELATED APPLICATIONS

This application is a Divisional and claims priority under 35 U.S.C. §120 to U.S. application Ser. No. 12/565,927, filed on Sep. 24, 2009 now U.S. Pat. No. 8,212,720. This application is related to co-pending U.S. patent application Ser. No. 12/394,404, filed on Feb. 27, 2009, entitled METHOD AND SYSTEM FOR GNSS COEXISTENCE. This application is related to co-pending U.S. patent application Ser. No. 12/568,084, filed on Sep. 28, 2009, entitled LOW COMPLEXITY TIGHTLY-COUPLED INTEGRATION FILTER FOR SENSOR ASSISTED GNSS RECEIVER, which claims priority under 35 U.S.C. S119(e) to U.S. Provisional Application No. 61/100,325, filed on Sep. 26, 2009. All of said applications incorporated herein by reference.

BACKGROUND

Embodiments of the invention are directed, in general, to communication systems and, more specifically, to methods of detecting lack of movement to aid GNSS receivers.

As Global Navigation Satellite System (GNSS) receivers become more common, users continue to expect improved performance in increasingly difficult scenarios. GNSS receivers may process signals from one or more satellites from one or more different satellite systems. Currently existing satellite systems include global positioning system (GPS), and the global navigation satellite system (GLONASS). Systems expected to become operational in the near future include Galileo, quazi-zenith satellite system (QZSS), and Beidou. For many years, inertial navigation (IN) systems have been used in high-cost applications such as airplanes to aid GNSS receivers in difficult environments. One example that uses inertial sensors to allow improved carrier-phase tracking may be found in A. Soloviev, S. Gunawardena, and F. van Graas, "Deeply integrated GPS/Low-cost IMU for low CNR signal processing: concept description and in-flight demonstration," *Journal of the Institute of Navigation*, vol. 55, No. 1, Spring 2008; incorporated herein by reference. The recent trend is to try to integrate a GNSS receiver with low-cost inertial sensors to improve performance when many or all satellite signals are severely attenuated or otherwise unavailable. The high-cost and low-cost applications for these inertial sensors are very different because of the quality and kinds of sensors that are available. The problem is to find ways that inexpensive or low-cost sensors can provide useful information to the GNSS receiver.

Low-cost sensors may not be able to provide full navigation data. Or they may only work in some scenarios. For example, an inertial sensor may be accurate while it is in a car, but inaccurate when carried by a pedestrian. In the past, most integration techniques for GNSS receivers and sensors assumed the sensors constituted a complete stand-alone navigation system or that its expensive components allow it to give precise measurements. Low-cost sensors cannot always allow for these assumptions. In addition, traditionally the IN system is assumed to be fully calibrated, which is not always possible.

One of the challenging use-cases for a GNSS receiver is when it is in an environment with poor satellite visibility (such as indoors) S. Schon, O. Bielenberg, "On the capability of high sensitivity GPS for precise indoor positioning," $5^{th}$ Workshop on Positioning, Navigation and Communication, pp. 121-127, March 2008; incorporated herein by reference. The typical approach is to integrate the received signal over a longer duration to boost the SNR enough to be able to synchronize to the satellites F. van Digglen, "Indoor GPS theory & implementation," *IEEE Position Location and Navigation Symposium*, pp 240-247, April 2002; incorporated herein by reference. This approach is feasible, but is very complex when the satellite signal levels are low. The proposed solution is better than this idea in several ways that are discussed below. Other existing approaches use other types of signals for determining location indoors, or use both GNSS signals and other signals in difficult scenarios J. Gonzalez, J. L. Blanco, et. al, "Combination of UWB and GPS for indoor-outdoor vehicle localization," IEEE International Symposium on Intelligent Signal Processing, pp. 1-6, October 2007; incorporated herein by reference. This proposal focuses on improving the performance of GNSS signals since they are the most reliable signals, and they are universally available already. However, the GNSS signals when processed as we propose here can also be used along with the processing of other signals.

GNSS receivers rely on correlating a known pseudo random sequence (also called a PN sequence) with the received signal to synchronize to the transmitted signal. For different GNSS systems the PN sequences are different, different patterns, different lengths, etc. Typically, the results of correlating the PN sequence to different segments of the received signal are combined to increase the SNR. A coherent combination is when the correlation results are added after compensating for phase rotation. One kind of non-coherent combination adds the magnitude of the correlation results. Due to phase differences between the correlation results, the coherent combination provides more SNR gain if the phase is known with sufficient accuracy. In many cases a data bit is modulated onto the PN sequence at the transmitter. This data bit can be seen as a change in phase, so it doesn't affect the non-coherent combination, but if the phase changes due to the data-bits aren't accounted for they can severely degrade the coherent combination.

The global positioning system (GPS) is a system using GPS satellites for broadcasting GPS signals having information for determining location and time. Each GPS satellite broadcasts a GPS signal having message data that is unique to that satellite. The message for a Coarse/Acquisition (C/A) format of the GPS signal has data bits having twenty millisecond time periods. The twenty millisecond data bits are modulated by a one millisecond pseudorandom noise (PRN) code having 1023 bits or chips. The PRN code for each GPS satellite is distinct, thereby enabling a GPS receiver to distinguish the GPS signal from one GPS satellite from the GPS signal from another GPS satellite. The twenty millisecond GPS data bits are organized into thirty second frames, each frame having fifteen hundred bits. Each frame is subdivided into five subframes of six seconds, each subframe having three hundred bits.

One of the important figures of merit for a GPS receiver is its time to first fix, or the time period that it takes the GPS receiver from the time that it is turned on to the time that it begins providing its position and/or time to a user. In order to make this time period short, GPS receivers may be designed for what is sometimes known as a hot start. For a hot start, the GPS receiver starts acquisition with information for its own approximate location, an approximate clock time, and ephemeris parameters for the locations-in-space of the GPS satellites.

For a hot start, when the GPS receiver is turned on or returns to active operation from a standby mode, the GPS receiver processes its approximate time and location with the almanac or ephemeris information to determine which of the GPS satellites should be in-view and generates GPS replica signals having carrier frequencies and pseudorandom noise (PRN) codes matching the estimated Doppler-shifted frequencies and the PRN codes of the in-view GPS satellites. A search pattern or fast Fourier transform is used to find correlation levels between the replica signals and the carrier frequency and the PRN code of the incoming GPS signal. A high correlation level shows that GPS signal acquisition has been achieved at the frequency, code and code phase of the replica and the GPS receiver may begin tracking the frequency and the time-of-arrival of the code of the incoming GPS signals. At this point the GPS receiver knows the timing of the GPS data bits but it cannot determine its position because it does not yet know the absolute GPS clock time.

The GPS clock time is conventionally determined by monitoring the GPS data bits until a TLM is recognized for the start of a subframe. Following the TLM word, the GPS receiver reads a Zcount in the GPS data bits in a hand over word (HOW) to learn a GPS clock time. A current precise location-in-space of the GPS satellite is calculated from the GPS clock time and the ephemeris information. The time-of-arrival of the code of the GPS replica signal is then used to calculate a pseudorange between the location of the GPS receiver and the location-in-space of the GPS satellite. The geographical location fix is derived by linearizing the pseudorange for the approximate location of the GPS receiver and then solving four or more simultaneous equations having the linearized pseudoranges for four or more GPS satellites.

What is needed is Improved GNSS performance in harsh environments such as indoors, parking garages, deep urban canyons, and the like.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Figure 1:
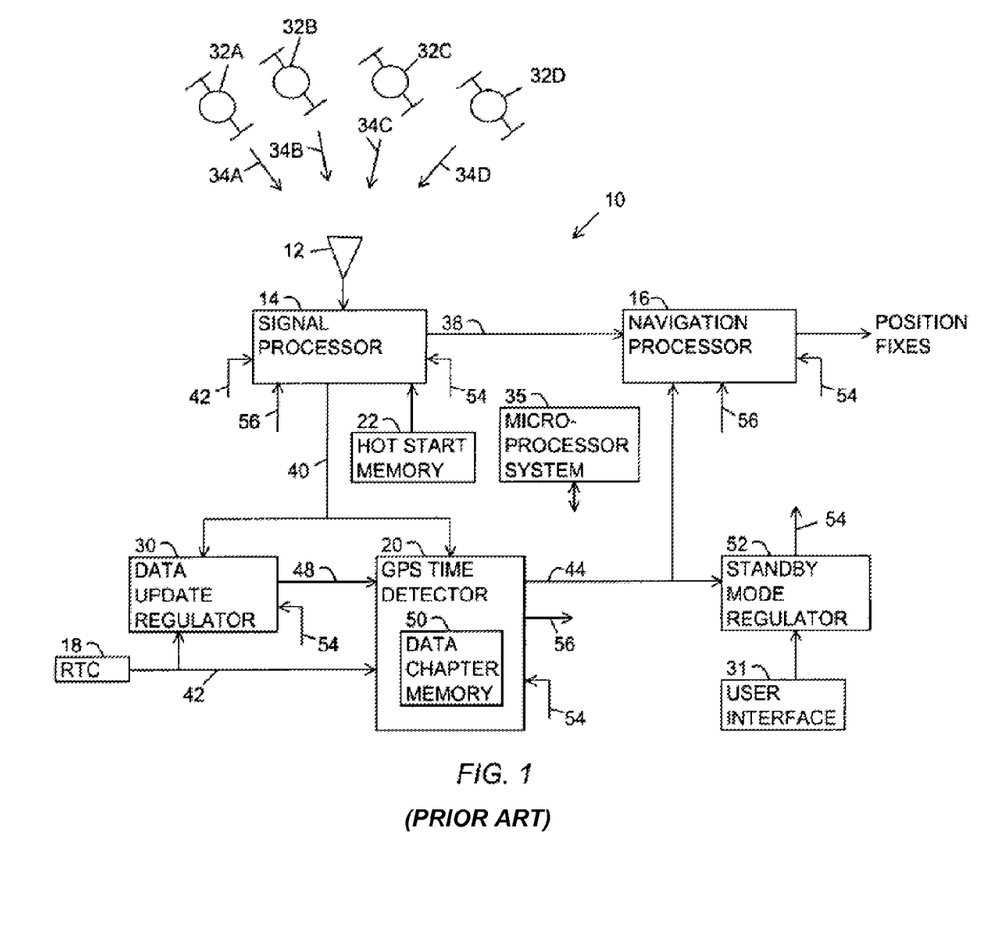
FIG. 1 is a block diagram of a global positioning system (GPS) receiver known in the art.

FIG. 1 is a block diagram of a global positioning system (GPS) receiver 10 known in the art. The GPS receiver 10 includes a GPS antenna 12, a signal processor 14, a navigation processor 16, a real time clock (RTC) 18, a GPS time detector 20, a hot start memory 22, a data update regulator 30 and a user interface 31. GPS signal sources 32A-D broadcast respective GPS signals 34A-D. The GPS signal sources 32A-D are normally GPS satellites. However, pseudolites may also be used. For convenience the GPS signal sources 32A-D are referred to as GPS satellites 32 and the GPS signals 34A-D are referred to as GPS signals 34 with the understanding that each of the GPS signals 34A-D is broadcast separately with separate GPS message data for each of the GPS signal sources 32A-D. A global navigation satellite system (GNSS) signal source and signal may be used in place of the GPS signal sources 32 and GPS signals 34. The receiver is described in the context of processing GPS signals, but can be used in the context of processing signals from any satellite system.

In order to more easily understand the embodiments of the invention, the structural elements of the best mode of the invention are described in terms of the functions that they perform to carry out the invention. It is to be understood that these elements are implemented as hardware components and software instructions that are read by a microprocessor in a microprocessor system 35 or by digital signal processing hardware to carry out the functions that are described.

The GPS antenna 12 converts the GPS signals 34 from an incoming airwave form to conducted form and passes the conducted GPS signals to the signal processor 14. The signal processor 14 includes a frequency downconverter; and carrier, code and data bit signal recovery circuits. The frequency downconverter converts the conducted GPS signals to a lower frequency and digitizes the lower frequency GPS signals to provide digital GPS signals. The signal recovery circuits operate on the digital GPS signals to acquire and track the carrier, code and navigation data bits for providing respective timing signals 38 and GPS data bit streams 40 for each of the GPS satellites 32. Parallel processing of the respective digital GPS signals is preferred so that the timing signals 38 and the data bit streams 40 are determined in parallel for several GPS satellites 32, typically four or more. The timing signals 38 generally include code phase, code chip timing, code cycle timing, data bit timing, and Doppler tuning.

The timing signals 38 are passed to the navigation processor 16 and the data bit streams 40 are passed to the GPS time detector 20 and the data update regulator 30. The GPS time detector 20 uses GPS clock time estimates 42 from the RTC 18 and the data bit streams 40 for determining a true GPS clock time 44 and passes the true GPS clock time 44 to the navigation processor 16. The navigation processor 16 includes a pseudorange calculator and a position detector using the timing signals 38 and the GPS clock time 44 for determining pseudoranges between the GPS antenna 12 and the GPS satellites 32 and then using the pseudoranges for determining a position fix. The navigation processor 16 passes the GPS clock time and position to the user interface 31.

The data update regulator 30 passes a specified collection 48 of data bits of the GPS data bit streams 40 to a data chapter memory 50 within the GPS time detector 20 for updating a block of GPS message data in the chapter memory 50. The user interface 31 may include keys, a digital input/output capability and a display for enabling a user to operate the GPS receiver 10 and view results of the operation of the GPS receiver 10. In general the user interface 31 is coupled through the microprocessor system 35 to each of the other elements of the GPS receiver 10.

The GPS receiver 10 also includes a standby mode regulator 52. The standby mode regulation 52 controls the GPS receiver 10 through control signals 54 to have an operation mode and a standby mode. The GPS receiver 10 may be directed to enter the standby mode at any time from the user interface 31.

In the operation mode, the GPS receiver 10 acquires the GPS signals 34 and determines a true GPS clock time 44; and uses the GPS clock time 44 for determining a two or three dimensional position fix. If time only is required, the GPS receiver 10 returns to the standby mode without determining the position fix. During the standby mode, the GPS receiver 10 reduces its power consumption and maintains standby data, including its position, in the hot start memory 22 for a state of readiness. The standby data includes the last known GPS time and position of the GPS receiver 10. Data for GPS ephemeris and almanac orbital parameters 56 is stored in the hot start memory 22 or the chapter memory 50.

When the GPS receiver 10 enters the operation mode after a time period in the standby mode, the signal processor 14 uses the GPS clock time estimates 42, the almanac or ephemeris parameters and the standby data for quickly providing the signal timing signals 38 and the data bit stream 40. The navigation processor 16 uses the GPS clock time 44, the stored ephemeris parameters, and the timing signals 38 in order to compute a first position fix for what is known as a hot start fast time to first fix (TTFF). The microprocessor system 35 is interconnected for controlling the signal processor 14, navigation processor 16, real time clock (RTC) 18, GPS time detector 20, hot start memory 22, data update regulator 30, user interface 31, data chapter memory 50 and standby mode regulator 52. The functions of the signal processor 14, navigation processor 16, real time clock (RTC) 18, GPS time detector 20, hot start memory 22, data update regulator 30, user interface 31, data chapter memory 50 and standby mode regulator 52 are implemented by the microprocessor 35 according to programmed software instructions on one or more computer readable mediums or by digital signal processing hardware or by a combination.

Embodiments of the invention will increase the probability that the GNSS receiver can acquire and/or track the GPS signals well enough to obtain an accurate position estimate in harsh environments.

In the embodiments of the invention, the interval over which the signal is coherently and/or non-coherently combined is called the integration time or the integration interval. Typically both coherent and non-coherent combining are used. One way to boost the SNR is to increase the integration time. Another way to boost the SNR, if the phase is tracked, is to increase the percentage of the integration time that uses coherent combining.

After using correlations with the PN sequence to synchronize to the transmitted signal (find frame boundaries, etc), the GNSS receiver can compute a pseudorange which is the distance from the user to the satellite plus a time bias. The GNSS receiver can also compute the satellite's position. Getting the satellite positions requires an almanac or ephemeris that can be decoded from the satellite signal itself, or loaded from some other source. Given the pseudorange to at least four satellites, and the positions of those satellites, the GNSS receiver can solve for its position (in three dimensions) and the time bias. Similarly, the GNSS receiver can solve for its velocity and the time drift (the derivative of the pseudorange).

There are many types of GNSS receiver architectures that can be used to achieve the coherent and/or non-coherent integrations. Two types are called a block-based receiver and a loop-based receiver. The block-based receiver implements different correlations assuming different alignments of the PN sequence with the received signal and different Doppler frequencies. When the correlation is used with the correct PN sequence alignment and the correct Doppler frequency the correlation value should be maximized. So the block-based receiver does a two-dimensional peak search over the PN sequence alignment (or code-delay) dimension and the Doppler frequency dimension. The code-delay and Doppler frequency are constantly changing, so before adding (coherently or non-coherently) two different correlations with the PN sequence the estimated code-delay must be used to align the correlation peaks from different times. Then when multiple correlations are combined the peak becomes larger. The loop-based architecture generally uses a delay-lock loop (DLL), a frequency-lock loop (FLL), and/or a phase-lock loop (PLL). Some correlation combinations (coherent or non-coherent) may be used prior to passing the result into the loops. The DLL tracks the movement of the correlation peak in the code-delay dimension, the FLL tracks the movement of the correlation peak in the Doppler frequency dimension, and the PLL tracks the phase of the correlation peak. Along with the amount of integration done prior to the loops, the loop bandwidths control the effective integration time of the loops. The loop discriminator controls how the loop combines the loop inputs; either coherently or non-coherently. Fundamentally, the loop-based and block-based architectures are both based on using multiple correlations with different code-delay and Doppler frequency hypotheses. The main difference is in how the correlation combining is done. In a conventional GPS receiver, the loop-based architecture operates on the result of a coherent combination (typically of no more than 20 ms unless navigation data bits are known apriori) and effectively does a non-coherent combination of these coherent combinations. The block-based architecture effectively takes a number of the coherent combinations and processes them as one block.

Embodiments of the invention use the fact that the Doppler due to the satellite motion can be computed from the data transmitted via the data-bits of the satellite signals themselves. In the GPS system, an almanac is periodically transmitted and remains valid for a month or longer. This almanac contains parameters that allow the receiver to compute the Doppler frequency due to the satellite motion for each satellite if the approximate position of the receiver is known. The almanac also contains parameters that allow the GNSS receiver to compute the position of each satellite and satellite clock corrections. Techniques also exist for extending the length of time for which the almanac is valid. In the GPS system an ephemeris is also transmitted via the data-bits modulated onto the satellite signal. The ephemeris contains more accurate parameters that allow the GNSS receiver to compute the satellite velocity (and hence the Doppler frequency due to satellite motion), the position of each satellite and satellite clock corrections. For geostationary satellites, an estimate of satellite motion is possible without an almanac or ephemeris because the satellite motion with respect to a user on earth is approximately zero.

However, the ephemeris transmitted by a GPS satellite is generally only valid for a few hours. But methods also exist to use improved satellite orbit and motion models to extend the amount of time for which an ephemeris can be used.

The GNSS receiver may also implement other methods in addition to those mentioned here. Ionospheric and/or tropospheric corrections are two examples of other kinds of corrections that are typical to GNSS receivers.

If the Doppler frequency between the GNSS receiver and the satellites were known, then the GNSS receiver could either increase the coherent integration time or the total integration time (or both) in order to boost SNR and operate at lower signal levels. Of course in general the Doppler frequency is not known because of errors in estimating satellite orbits, satellite clock errors, user movement and receiver clock errors are always changing. However, the Doppler frequency due to satellite velocity and clock errors can be known from aiding information (almanac and/or ephemeris and/or other aiding source). If the user is stationary, then user movement does not contribute anything to the Doppler frequency, which leaves the receiver clock errors as the only unknown contributor to the Doppler frequency. This makes it easier for the receiver to estimate the Doppler frequency and therefore operate in lower SNR conditions.

Figure 2:
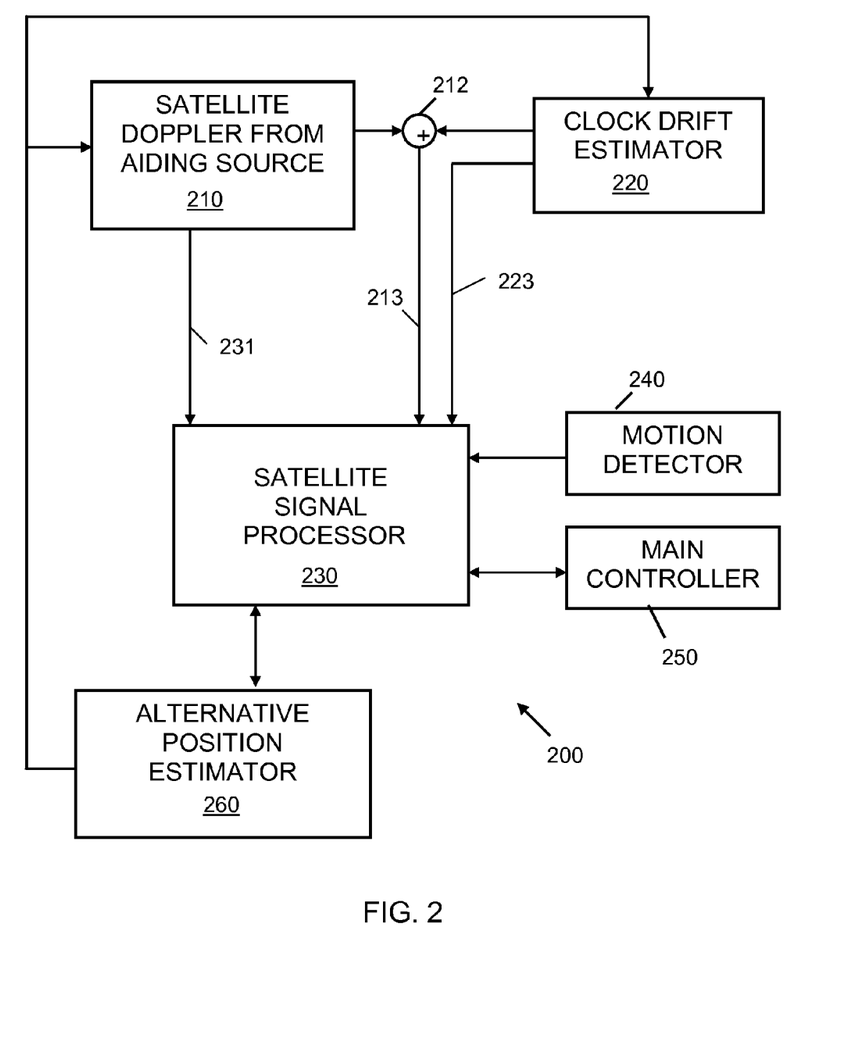
FIG. 2 is a block diagram showing an embodiment of the invention.

FIG. 2 shows a block diagram of a system embodiment 200. Signal processing is provided by Satellite Signal Processor 230. Satellite Doppler from Aiding Source 210 provides a reliability measure of itself 231 to Satellite Signal Processor 230. Clock Drift Estimator 220 computes an estimate of the receiver clock drift 220 may also provide a reliability measure of itself 223 to Satellite Signal Processor 230. Satellite Doppler from Aiding Source 210 may provide knowledge of how the Doppler due to satellite motion and/or satellite clock error at the GNSS receiver by combining 212 estimates of the receiver clock drift and Doppler information to get Doppler frequency 213. Motion Detector 240 provides measurements about the user's movement. The output of Motion Detector 240 may come from low-cost sensors and/or processing of the satellite signals. The Main Controller 250 provides sources of other information that may help the GNSS receiver. Alternative Position Estimator 260 provides a rough estimate of the current user position. Satellite Signal Processor 230 represents how the GNSS receiver can use all these information sources to better process the received signal and synchronize to the satellites. There are several ways to realize each of these blocks that are discussed below.

Getting information about the Doppler frequency from some other method than processing the received signal is instrumental to exploiting knowledge of when the user is stationary. Some possible sources of the Doppler frequency are 1. The last good Doppler measurement includes contributions from all contributors to Doppler frequency.
2. The last good Doppler measurement when user was stationary includes contributions from all contributors to Doppler frequency, except user motion is not a contributor in this case.
3. Estimates derived from the data-bit messages of the satellites. For example, in GPS an almanac and/or an ephemeris may be used to estimate satellite velocity. This only includes satellite contributions to Doppler frequency. This requires a rough estimate of the user position. Knowing the user's position to within one mile is typically good enough to get a Doppler frequency that is accurate to within 1 Hz for a GPS satellite as long as the GNSS receiver is stationary. Some ways to get this rough estimate of the user position are described below.
4. Assistance network, like a cellular network which gives assistance to GNSS receivers. The assistance network may provide either Doppler frequency estimates directly, or a set of parameters to help in computing a Doppler frequency estimate.
5. Other aiding sources may also provide information to help the GNSS receiver estimate the Doppler frequency. For example, the wide-area augmentation system (WAAS) has satellites that transmit data in a similar manner to GPS satellites over North America. The messages taken from the data bits modulated onto their transmissions may be used to help get a more accurate Doppler frequency estimate. Other similar systems exist for other parts of the world, and these kinds of systems are generally known as Satellite Based Augmentation Systems (SBAS).

Clock Drift Estimation

Even if the user is stationary, the GNSS receiver clock can drift. In most cases the drift can be assumed to be negligible during the integration. If the integration time is long or includes data separated in time, then clock drift may not be negligible. Some unfavorable events can also cause unusually high clock drift. An example of an unfavorable event is when the GNSS receiver is in close proximity to a modem (such as cellular or Bluetooth modem) which is transmitting and which can heat up the receiver's clock and worsen its drift. Some ways to overcome clock drift are listed below:

1. If the pseudorange of at least one satellite can be estimated and the GNSS receiver has access to an estimate of the user position, then the clock bias and/or the clock drift can be estimated. In this case, the only unknown in the pseudorange is the clock bias, and if the user is stationary the only unknown in the pseudorange rate is the clock drift.
2. If the Doppler frequency can be estimated for at least one satellite, then the clock drift can be estimated (without knowing the receiver position) by comparing the estimated Doppler frequency to the Doppler frequency from the aiding source when the user is stationary (the aiding source may require an approximate receiver position). The difference in the two Doppler frequencies is primarily due to clock drift, and so can be used to estimate clock drift. So the receiver can maintain an estimate of the clock drift and/or clock bias by processing only one satellite signal. The clock drift and/or clock bias estimates thus obtained can be used to enable other satellite signals to be acquired more efficiently. This can be achieved by adding the clock drift estimate to the approximate Doppler frequency estimate of each SV around which the receiver is searching. Or by accounting for the impact of the sub-ms portion of the clock bias in the location of the correlation peak being searched for.
   a. As a specific example of this embodiment, a Kalman filter is used to track position (x, y, z), velocity (dx, dy, dz), clock bias (b) and clock drift (db). If the motion detector determines the user has not moved then the position states will not change and the velocity states are zero. This leaves only two states (b and db) to be estimated. Only one SV signal is sufficient to estimate these states (using more SV signals may improve the accuracy of the estimation), and the other SV signals can be processed using the updated clock drift estimate. The Kalman filter state definition could be changed when the motion detector determines the user to be stationary, but a preferred implementation is to provide new measurements to the Kalman filter. Multiple measurements could be given. For example, x=previous x, y=previous y, z=previous z, dx=0, dy=0, and dz=0, along with the corresponding uncertainties from the sensor module. Alternatively, the motion detector can provide a single speed measurement to the Kalman filter, along with a corresponding uncertainty. Co-pending application U.S. Provisional application Ser. No. 12/568,084, filed on Sep. 28, 2009, entitled LOW-COMPLEXITY TIGHTLY-COUPLED INTEGRATION FILTER FOR SENSOR-ASSISTED GNSS RECEIVER, (Docket Number TI-67103) shows how to add speed measurement.
3. If another reference signal is available, the GNSS receiver can use it to track its own clock drift.
4. Assume the clock drift from the last good measurement is still valid.
5. Assume the change in clock drift is negligible, the estimated clock drift would then be constant.

Motion Detector

Detecting when the user is stationary is an important part of this system. The Motion Detector 240 may either be based on the satellite signals, or on a signal from low-cost sensors.

In some cases, the GNSS receiver may be able to detect when the user stops moving even though it cannot track all the satellite signals. For example, if the estimated user speed is below a threshold it can be declared as stationary. Or the user's estimated speed can be the output of the Motion Detector 240.

Low-cost sensors can give some useful information even if they don't provide a complete navigation system. Using sensors to compute a likelihood that the user is stationary, or simply to detect when the user is stationary, and/or an upper bound on user displacement are three specific sensor outputs that can help the GNSS receiver improve performance.

Below are some ways to implement the Motion Detector 240:
1. Use one or more accelerometers with or without calibration to detect when the receiver is stationary. The following are some example metrics. These metrics can be output directly as a likelihood the user is stationary, or they can be compared against a threshold to declare the user as stationary or non-stationary. The metrics include, but are not limited to:
    a. The variance of the magnitude of the acceleration measurement,
    b. the variance of the acceleration measurements,
    c. the mean of the magnitude of the acceleration measurements,
    d. the mean of the acceleration measurements,
    e. a combination of the mean and/or variance,
    f. approximations of the mean and/or variance,
    g. the peak-to-peak distance in the magnitude of the acceleration measurement, and
    h. the peak-to-peak distance in the acceleration measurements.
2. Use calibrated accelerometers to measure movement in different directions.
3. Use a pedometer to detect minimal movement with or without calibrated sensors. One way to implement a pedometer is to use accelerometers. The frequency of steps can be used to estimate user velocity by using an estimated step length.
4. The functionality of the sensor system can even be implemented by the GNSS receiver itself. For example, in an urban canyon environment very few satellites may be cleanly visible. From the satellites it can see the GNSS receiver may be able to tell when the user is stationary or nearly stationary. It can then use the fact that the user is stationary to try and improve processing of other satellites.
    a. if speed is less than a threshold then user can be said to be stationary.
        i. speed could be estimated as the magnitude of the estimated velocity vector. The speed could be a three dimensional speed, or a horizontal speed, or even an one dimensional speed.
    b. if the residual Doppler frequency (after subtracting the component due to satellite motion) for at least two satellites is nearly the same then user is likely to be stationary. In this case the clock drift is the main component in the two residual Doppler frequencies.

When the GNSS receiver is co-located with other devices, the controller of the device may be able to provide some useful information. Specifically, in this system, if the controller of the device has knowledge about other things going on in the device that may affect the Doppler frequency between the GNSS receiver and the satellites, then that can be useful. One example of an 'unfavorable event' that may cause increase receiver clock drift is when a co-located modem is transmitting. This can heat up the GNSS receiver and cause its clock to have increased drift. When such an event occurs in the device below are some ways that its effect can be mitigated.
1. The controller communicates to the GNSS receiver whenever any of these 'unfavorable events' are happening. The GNSS receiver treats this event as if the user is not stationary, i.e. it does not increase integration time whenever it is informed about such events.
2. Use handshaking between GNSS receiver and the controller. For example, the GNSS receiver informs the phone about the difficulty of the scenario and the need for larger integration periods (during which the rest of the device has to avoid events that may increase clock drift), and the controller decides whether to accept/reject the request. An example of handshaking is disclosed in co-pending U.S. patent application Ser. No. 12/394,404, filed on Feb. 27, 2009, entitled METHOD AND SYSTEM FOR GNSS COEXISTENCE. Said application incorporated herein by reference.

Alternative Position Estimator 260 is used to provide a rough position estimate which may be useful to help obtain the satellite Doppler and/or the clock drift as mentioned above. Some ways to get a rough estimation for the user position are listed below. In some cases it is acceptable for this position estimate only be accurate to within about a mile or even worse.
1. Use last known position.
2. Use last known position, if the maximum displacement from the sensor is below a threshold.
3. Use coarse position estimate from another aiding source like a cellular assistance network
4. Use the position estimate from a co-located position estimator using non-GNSS signals.
    a. The alternative position estimator may use cellular signals from one or more base stations to get an approximation of its position.
    b. Other non-GNSS signals may also exist, or be developed in the future that can allow a device to approximate its own position. Digital TV broadcasts for example, or ultra wideband (UWB) signals and the like which are known in the art or equivalents which may be developed in the future.
    c. The user could tell the GNSS receiver the approximate location (zip code, address, etc).
    d. Proximity to another device that is communicating its position or whose position is otherwise known.
    e. An assistance network could communicate an approximate position to the GNSS receiver.

The Satellite Signal Processor 230 uses information from some or all of the other system blocks to try to improve its performance in harsh environments. Several ways to improve performance based on this information are discussed below.

First of all, the integration time can only be extended beyond normal limits when the user is stationary and there are no 'unfavorable events' occurring in the device. The Satellite Signal Processor 230 may monitor the signals from the sensors and the Main Controller 250 to know when both conditions are satisfied. For the occasions when these conditions are satisfied the user is said to be stationary. The user doesn't need to be exactly stationary for these methods to work. Sometimes negligible motion will not add significantly to the Doppler frequency seen by the receiver. The sensors may signal to the GPS receiver either the estimated amount of motion or simply an indication of whether the motion is negligible or not. For this purpose, the Motion Detector 240 may define categories of motion such as stationary, walking, stationary in an automobile, driving in an automobile, bicycle, etc. Likewise the Main Controller 250 may communicate how severely the 'unfavorable event' may affect the GNSS clock. In some cases the GNSS receiver may choose to ignore one or more of the signals from the sensors and/or one or more of the signals from the Main Controller 250. For example, if the GNSS receiver is already tracking its position and doesn't need any help it may ignore the signal from the sensors that the receiver is stationary. Or in another example, the GNSS receiver may be designed to disregard any 'unfavorable event' messages.

Even in the absence of an inertial navigation (IN) system to aid the GNSS receiver the proposed methods can be used. For example, if the signal levels for the satellites the GNSS receiver is tracking all fall to very low values for a period of time, the GNSS receiver can assume that it has moved indoors or into some other harsh environment and so begin trying to boost the SNR. In this embodiment, the GNSS receiver processes the received signal to replace the functionality (or augment it) of the sensors.

Once the GNSS receiver knows that the user is stationary it can use this information in several ways. First, if the satellite signals are very weak then it can increase the SNR boost from integration by increasing coherent integration time, non-coherent integration time, or both. This extra SNR boost can be achieved in a variety of ways depending on the architecture of the GNSS receiver. The basic idea is to use the Doppler aiding information from the aiding source and/or the clock drift estimator to extend the integration time beyond normal limits and therefore allow for increased SNR boosting. A second way the GNSS receiver can exploit the fact that it knows when the user is stationary is to integrate across multiple intervals when the user is stationary while skipping the interval when the user is not stationary. A third use of this information is to make re-acquisition of satellites easier. A fourth use of this information is to correct the Doppler frequency used to process one or more satellites.

Embodiments of the invention may be used with any receiver architecture. Below a detailed description is given for two example architectures.

The loop-based tracking module may contain delay-lock loop (DLL), frequency-lock loop (FLL), and/or phase-lock loop (PLL). Each may have a unique bandwidth. If there are not any user dynamics, then the bandwidth on these loops may be tightened.

Figure 3:
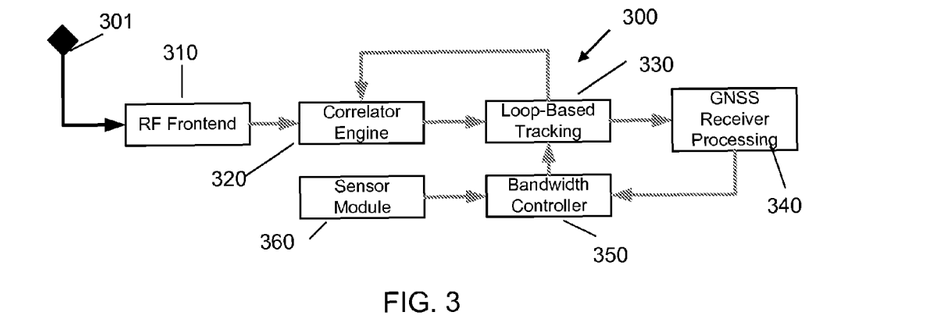
FIG. 3 is a block diagram illustrative of a receiver system in accordance with an embodiment of the invention.

Referring now to FIG. 3 which is a block diagram illustrative of a receiver system 300 in accordance with an embodiment of the invention. The RF frontend 310 is coupled to an antenna 301 to receive signals, correlator engine 320, loop-based tracking 330, and GNSS receiver processing 340 modules represent a GNSS receiver. Here, the correlator engine 320 may include coherent combining and the loop-based tracking 330 effectively does non-coherent combining. Therefore, adjusting the bandwidth is equivalent to adjusting the non-coherent and coherent combining. The amount of coherent combining could be changed as part of the adjustment as well.

The GNSS receiver processing module 340 may pass user dynamics such as velocity and/or acceleration into the bandwidth controller 350. The sensor module 360 passes measurements of user dynamics to the bandwidth controller 350. This could be estimates of user acceleration, user speed, or user velocity or a binary indication of whether the user is moving. The bandwidth controller 350 uses inputs from the sensor module 360 and/or the GNSS receiver processing module 340 to make a decision on the best loop bandwidth for the DLL, FLL, and/or PLL (they can have unique bandwidths). One part of the decision is driven by the SNR of the signal, because if the SNR is high then there is no benefit to tightening the loop bandwidth. In one embodiment, if the SNR for the signal is below a threshold and the user movement is determined to be stationary, then the loop bandwidths can be set to a minimum value. In other embodiments, if the SNR is below a threshold S1, and the users estimated speed is below a threshold V1, then the loop bandwidths are set to predetermined value B1. But if the SNR is below a threshold S2, and the users estimated speed is below a threshold V2, then the loop bandwidths are set to predetermined value B2. Multiple of thresholds may be predefined.

1. When the receiver uses a DLL to track code-delay and an FLL to track Doppler frequency some ways to effectively increase the integration time are:
    a. Lower the loop bandwidths of the DLL and FLL and inject the known Doppler frequency (from "Satellite Doppler from aiding source" block) into the FLL and DLL. Depending on the design lowering the order of the loops may also be helpful.
    b. Lower the loop bandwidths of the DLL and FLL and inject the known Doppler frequency only into the FLL. Then, the Doppler frequency estimate of the FLL can be used to aid the DLL. Depending on the design lowering the order of the loops may also be helpful.
    c. The bandwidths of the FLL and DLL can be changed dynamically according to the estimated motion from the sensors. For example, if the user is stationary, the bandwidths can be reduced.
    d. Assume the given Doppler frequency is correct, so that the FLL is not necessary. Now the DLL can be aided with the known Doppler frequency directly instead of by the Doppler frequency from the FLL.
    e. Increase the coherent integrations done prior to the loops. This may require knowledge of the data bits.
    f. A phase locked loop (PLL) is sometimes used to track carrier-phase to aid the DLL and/or FLL. It is even possible to replace the functionality of the FLL with the PLL. So the above embodiments can be applied to a PLL as well.
2. Block-processing receiver
    a. Limit the two-dimensional peak search to a small number of Doppler frequency hypotheses around the given Doppler frequency.
    b. The given Doppler frequency can also be used to properly add up the correlations over a longer duration (either coherently or non-coherently) thereby increasing the integration time and the SNR.

3. Methods 1 and 2 may use a combination of coherent and/or non-coherent integrations. Using coherent integrations provides more SNR gain. So in some cases increasing the coherent integration time without increasing the overall integration time can give some SNR gain.
4. In both loop-based and block-based architectures it may be helpful to buffer the incoming signal if there is a delay in the motion detector's detection of user movement.

In general the integration time will be non-coherent if the integration interval straddles a data-bit boundary. Typically, the result of shorter coherent integrations are combined non-coherently. Also depending on the GNSS system there is a limit to the duration of coherent integrations because of the data bits modulated onto the signal. However, it is possible to first remove the data bits if they are known or can be reliably estimated beforehand. If the data bits are removed then coherent integration over a longer interval is possible.

In practical use, the user may not be stationary for long enough to adequately boost the SNR of the signal. For example, it is shown in F. van Diggelen, "Indoor GPS theory & implementation," *IEEE Position Location and Navigation Symposium*, pp 240-247, April 2002 (incorporated herein by reference) that to detect satellite signals at −156 dBm and −160 dBm requires ten and thirty seconds of integration, respectively. It is often impractical to assume the user is stationary for such a long time. Then as the user moves the Doppler frequency can change significantly and if the receiver continues to process the signal while the user moves with an inaccurate Doppler estimate the effective SNR will be reduced—perhaps causing satellite tracking to fail. Detection of when the user is stationary can be used to combat this degradation if the GNSS receiver only processes the signal when the user is stationary and blanks out the signal the rest of the time. If the Doppler frequency is known for the intervals when the user is stationary the receiver can process only these intervals and thereby boost the SNR enough to track and/or acquire the satellite. A specific example of this for loop-based receivers is to use a 2-to-1 multiplexer to input zeros into the loops while the user is moving and pass the usual samples into the loops while the user is stationary so that the user caused changes in Doppler frequency do not distort the state of the loops.

The processing of the received signal is typically based on coherently or non-coherently combining multiple correlations with the known PN sequence. Since the satellites are in constant motion the distance from the user to the satellite is constantly changing. This causes the location of the correlation peak to move as well. The movement of the peak is proportional to the Doppler frequency of the satellite. When combining the results of multiple correlations, the GNSS receiver accounts for this peak movement using its estimate of the Doppler frequency. Therefore, the GNSS receiver can combine correlation results separated by an arbitrary time gap as long as the Doppler frequency is properly accounted for. In the proposed solution, the Doppler frequency due to satellite movement is known from the almanac or other aiding sources for the intervals when the user is stationary and for other intervals when the user is not stationary. So the GNSS receiver can process the signal from the stationary intervals together while skipping over the intervals when the user is not stationary in order to boost SNR enough to track or re-acquire a satellite signal.

Figure 4:
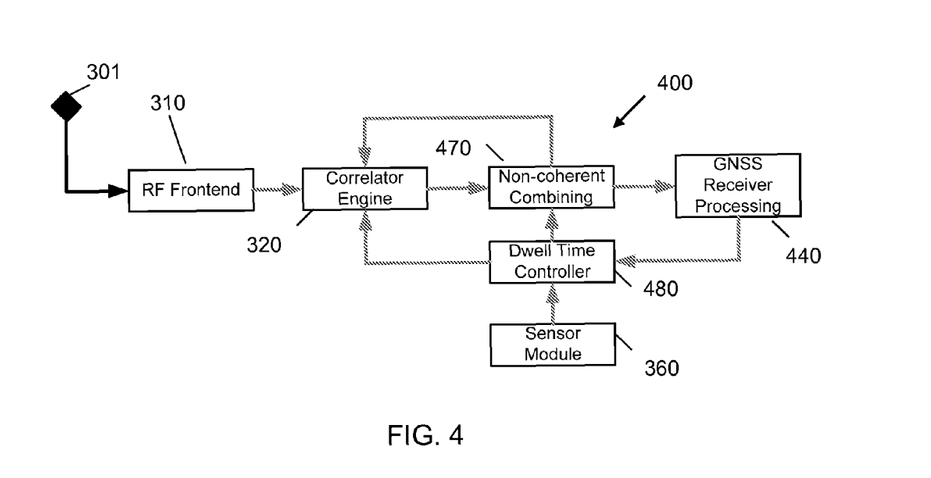
FIG. 4 is a block diagram illustrative of a block-based receiver in accordance with another embodiment of the invention.

FIG. 4 is a block diagram illustrative of a block-based receiver 400. The amount of non-coherent combining 470 is defined by the dwell time used by the receiver. For example, many GPS receivers do 20 ms of coherent combining (as part of the correlator engine 320) and then non-coherently combining 470 combines 50 samples so that a new measurement is obtained every second. In that typical case, the dwell time is 1 sec and that dwell time configuration is specified as a (M,N) combination where M=20 and N=50. In general, the parameters M and N can be changed to improve the SNR gain with or without increasing the duration of the dwell time; herein this is referred to as adjusting the coherent and/or non-coherent combining. Adjusting the coherent and/or non-coherent combining is also referred to as adjusting the bandwidth of the block-based receiver; increasing the bandwidth is equivalent to decreasing the dwell time and decreasing the bandwidth is equivalent to increasing the dwell time. At low SNR more coherent and/or non-coherent combining may be necessary in which case the dwell time may increase (If more coherent combining and less non-coherent combining are done then the duration of the dwell time may not increase even though processing gain is increased). The dwell time controller 480 controls how much coherent and non-coherent combining 470 is done. The dwell time is controlled on a per satellite basis. The dwell time can differ for each satellite being tracked.

If the sensor module 460 detects that the user is stationary, and the SNR for one or more satellites is such that more combining may be required, then the dwell time controller 480 adjusts coherent and/or non-coherent combining.
    a. Alternatively, the GNSS receiver 440 may be required to confirm the user is stationary.
    b. Alternatively, the GNSS receiver 440 may provide the data bits to allow for extended coherent integration (beyond 20 ms for GPS).

Figure 5:
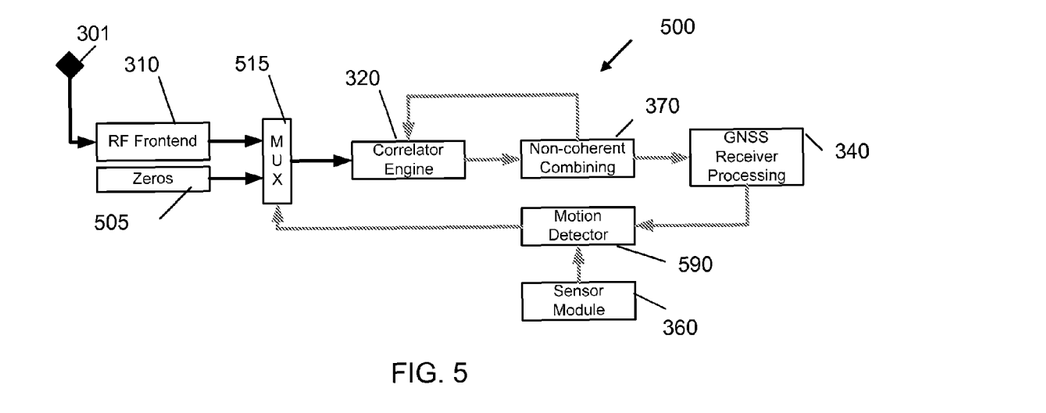
FIG. 5 is a block diagram illustrative of a block-based receiver in accordance with a further embodiment of the invention.

FIG. 5 is a block diagram illustrative of a block-based receiver in accordance with a further embodiment of the invention. In this embodiment 500, if the motion detector 590 determines the user is moving such that the Doppler frequency will be distorted enough to impair receiver performance, it can have zeros input 505 into the correlator engine 320 multiplex through MUX 515 with input from RF frontend 310 until the user movement returns to a more acceptable level. As one skilled in the art can appreciate, this implementation could be accomplished without a mux as well. For example, the incoming signal could be multiplied by the mux selector value; a value of 1 leaves the signal unchanged and a value of zero passes a zero—also known as blanking the signal. Or the input to the correlator engine can just be overwritten with zeros.

Loop-based receiver: When the user is stationary the loops process the signal normally. When the user is not stationary the input to the loops is forced to zero so that the loop state is not affected by the signal while the user is moving. When the user stops again, the Doppler frequency can again be injected into the tracking loops or it can be assumed that the Doppler frequency hasn't changed. While skipping over the time when the user is not stationary the tracking loops will assume the correlation peak movement continues at the same rate. Alternatively, the clock drift could be estimated separately. Then when the user is stationary again the loops can continue processing without interruption. If the gap skipped over is long, then the Doppler frequency in the loops can be updated periodically the same as they would be when processing the signal while the user is stationary.

Block-processing receiver: The block processing receiver can operate normally except that when the user is not stationary, the correlation results are forced to zero. Also, the time when the correlation results are forced to zero should not count towards the total integration time.

It is even possible to process the full satellite signal and only the part of the signal when the user is stationary separately in the same GNSS receiver. That way there wouldn't be any unnecessary delay in the GNSS receiver's ability to track the satellite signal when its signal level rises.

Another way the sensors can help the GNSS receiver is by estimating the maximum displacement since some time in the past. For example, it can keep an estimate of the maximum displacement since the GNSS receiver last used the satellites to get its position. If that maximum displacement is less than a threshold (if the sub-ms portion of the pseudorange is unchanged) then the location of the GNSS receiver is known roughly and some tricks can be used to help it track satellites with weak signals. For example, if the receiver knows GPS time to within 1 ms and it knows the position of each SV (via the ephemeris or almanac for example) and it knows its own position, roughly, the GNSS receiver only needs to find the correlation peak in order to get a pseudorange to the SV. In other words the receiver can avoid the frame synchronization that is usually required before a satellite can be tracked.

Also if the GNSS receiver knows its approximate position and the code-delay to one satellite it can compute the approximate code-delay of the other satellites. This is possible because the satellite positions are known, and the clock bias can be estimated from the one satellite that is already acquired.

It may happen that the receiver's estimate of the Doppler frequency from one or more satellites may become corrupted hurting how well the receiver tracks the correlation peak and therefore hurting the overall performance. There may be many causes of this. For example, the satellite may be temporarily blocked, or there could be temporary interference. When the user is stationary, the receiver has an opportunity to correct the Doppler frequency it uses to process the satellite signals. By replacing its own corrupted Doppler frequency estimate with the Doppler frequency estimate provided by the aiding source it can regain lock on the satellite signal quicker.

Alternatively, the receiver could continue trying to process the satellite signal with its own Doppler estimate and simultaneously start a separate process to track the same satellite signal using the Doppler frequency from the aiding source. This will allow the receiver to evaluate which Doppler frequency estimate is better. It may be prudent to only start these "extra" processes for satellites whose Doppler frequency estimates are significantly different than those provided by the Doppler aiding source.

Figure 6:
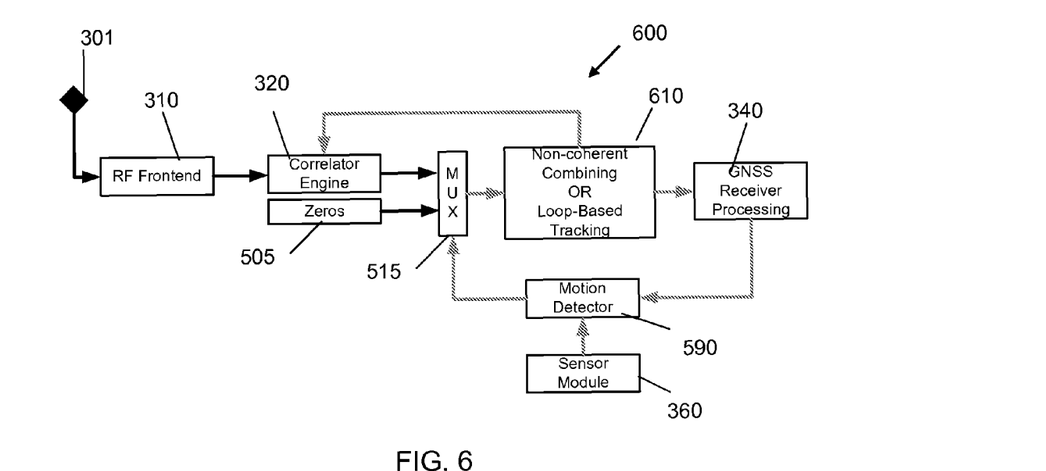
FIG. 6 is a block diagram illustrative of a receiver in accordance with a further embodiment of the invention.

FIG. 6 is a block diagram illustrative of a receiver in accordance with a further embodiment of the invention. Receiver 600 includes Non-coherent Combining or Loop-Based Tracking 610 in this embodiment.

Figure 7:
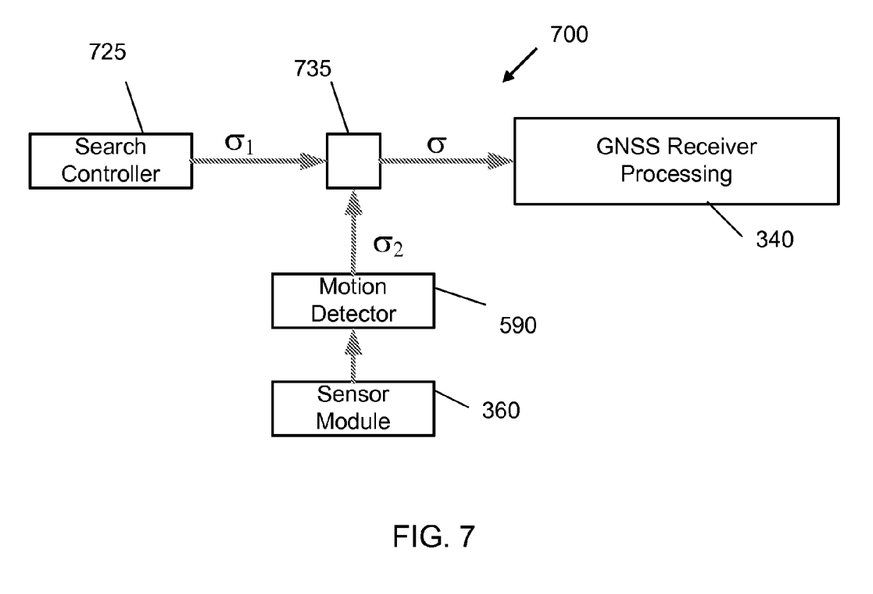
FIG. 7 is a block diagram illustrative of an uncertainty in a GNSS receiver in accordance with an embodiment of the invention.

FIG. 7 is a block diagram illustrative of an uncertainty in a GNSS receiver in accordance with an embodiment of the invention. In this embodiment of GNSS receiver system 700, when it is acquiring a satellite signal, searches over multiple time delay and Doppler frequency hypotheses around an initial estimate of each. The initial estimate can come from an assistance source, or be an arbitrary value if no apriori information is available. The number of hypotheses that are required is determined by the uncertainties in time and frequency. For example, if the initial frequency estimate is f0 and the frequency uncertainty is 250 Hz, then the set of frequency hypotheses should cover a range of frequencies f0±250 Hz with some minimum distance between hypotheses. Generally speaking, the size of the frequency uncertainty depends on the quality of the initial estimate, the maximum user velocity, and the maximum clock drift. In this embodiment, the Search Controller 725 determines the frequency uncertainty assuming no user motion. Then the Motion Detector 590 determines the frequency uncertainty due to user motion. The two uncertainties are combined 735 (just an addition, or the square-root of the sum of the squares) to give the total uncertainty. If for any reason the motion detector 590 is unable to get a reliable user motion estimate, it outputs the uncertainty corresponding to the maximum allowed user velocity. The Motion detector 590 may also scale the frequency uncertainty due to user movement by the cosine of the elevation angle of the satellite being acquired. The simplest embodiment is to output zero uncertainty due to user motion if the motion detector finds the user to be stationary, and output the maximum uncertainty due to user motion otherwise. This embodiment can be used when the receiver first begins searching for satellite signals before getting its first position fix. It can also be used when the receiver is already tracking other satellite signals in order to reduce the time necessary to acquire or re-acquire another satellite signal.

Here are some examples of scenarios where the proposed techniques can be beneficial.

1. Moving from an environment where normal GPS operation is sufficient into a harsh environment where longer integration time is needed.
    a. In this context a harsh environment is any environment that causes the signal level of any satellite to drop so low that it requires extended integration time and the GNSS receiver still chooses to try to track the satellite.
    b. Typical harsh environments would be indoors where there may be as few as one strong satellite, or no strong satellites. Also parking garages, etc where there is severe attenuation of satellite signals.
2. GNSS receiver start-up in a harsh environment when updated ephemerides and/or almanac are available or the aiding information is available from some other source. The same benefits would apply after the GNSS receiver gains access to this aiding information.
3. GNSS receiver start-up when neither almanac, ephemerides, nor other aiding networks are available. For example, if the user can input their approximate position then the sensor information can help.
4. Correct Doppler estimates during normal operation when the user is stationary—even if the environment is not harsh. If the receiver has locked onto the wrong Doppler frequency or code-delay for some reason it could correct itself using these proposed techniques. This often happens in deep urban canyon scenarios, and the proposed solution can sometimes be implemented even without sensors.

Figure 8:
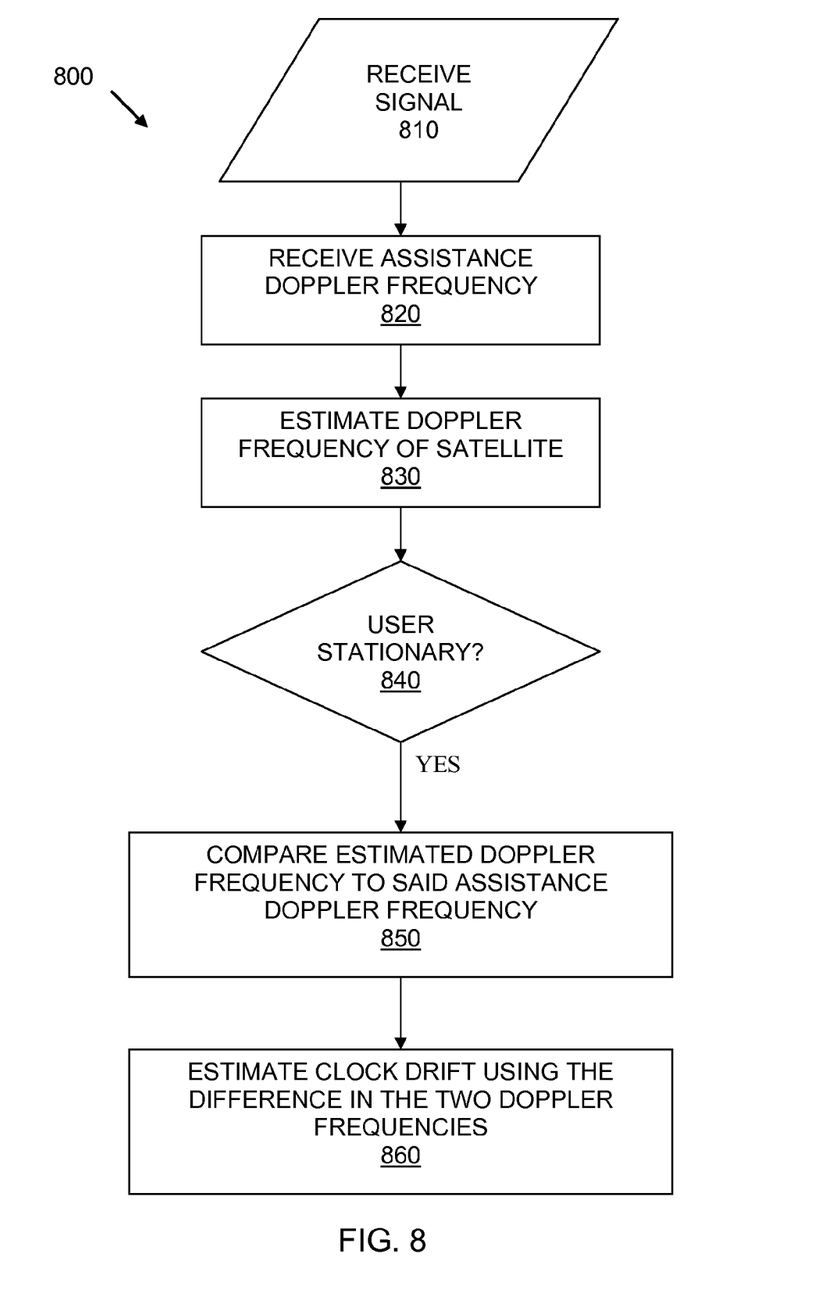
FIG. 8 is a flowchart illustrative of a method in accordance with an embodiment of the invention.

FIG. 8 is a flowchart illustrative of a method in accordance with an embodiment of the invention. Method 800 begins by receiving a signal from at least one satellite 810. An assistance Doppler frequency is obtained from aiding source at 820. At 830, an estimate of Doppler frequency is obtained. If the user is stationary or has negligible motion 840, a comparison is made between the estimated Doppler frequency and assistance Doppler frequency 850. The difference between the estimated Doppler frequency and assistance Doppler frequency is used to estimate clock drift 860.

Figure 9:
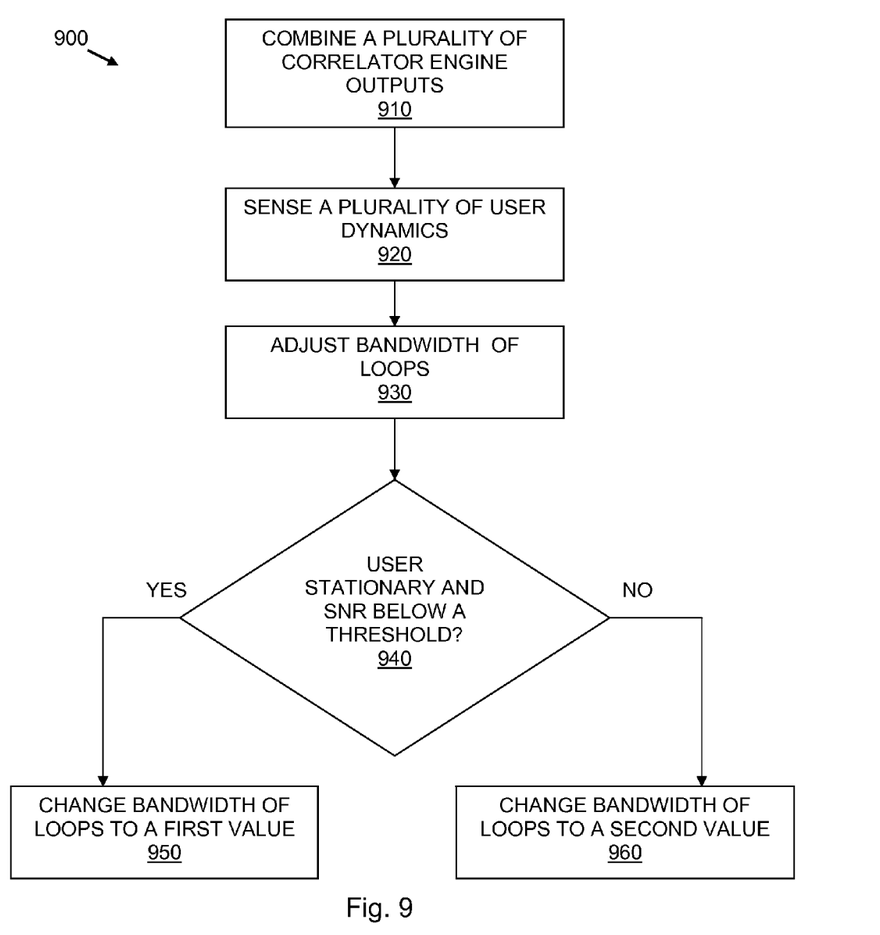
FIG. 9 is a flowchart illustrative of another method in accordance with an embodiment of the invention.

FIG. 9 is a flowchart illustrative of another method in accordance with an embodiment of the invention. Method 900 begins by combining a plurality of correlator engine outputs 910. At 920, a plurality of user dynamics are sensed via sensors. The bandwidth of loop or loops are adjusted 930. The bandwidth value is changed depending on if user is stationary and signal to noise ratio (SNR) is below a threshold 940. The bandwidth is change to a first value if the user is stationary or has negligible motion and SNR below a threshold 950 or to a second value if the user is not stationary and SNR below a threshold 960.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation. Applicants specific define "plurality" to mean 1 or more.

What is claimed is:

1. A method for reacquiring satellite signals quickly, said method comprising:

estimating a pseudorange of at least one satellite using a position estimate from a co-located position estimator using ultra wideband (UWB) signals;

estimating a user position; and receiving a signal from at least one satellite.

2. The method of claim 1, wherein estimating a user position comprising using a last known position of said user.

3. The method of claim 1, wherein estimating a user position comprising using a last known position if a maximum displacement as calculated from a plurality of sensor measurements is below a threshold.

4. The method of claim 1, wherein estimating a pseudorange of said at least one satellite comprising using coarse position estimate from an aiding source.

* * * * *